US006898658B2

United States Patent
Toguchi et al.

(10) Patent No.: US 6,898,658 B2
(45) Date of Patent: May 24, 2005

(54) METHOD TO PREVENT NET UPDATE OSCILLATION

(75) Inventors: Kazunobu Toguchi, White Plains, NY (US); Takashi Sato, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 520 days.

(21) Appl. No.: 10/029,824

(22) Filed: Dec. 27, 2001

(65) Prior Publication Data

US 2003/0126340 A1 Jul. 3, 2003

(51) Int. Cl.[7] ............................................. G06F 13/36
(52) U.S. Cl. ...................... 710/306; 710/104; 710/317; 710/316; 710/1; 710/2; 710/100
(58) Field of Search ................................ 710/104, 306, 710/317, 316; 713/1, 2, 100

(56) References Cited

U.S. PATENT DOCUMENTS

| 5,923,673 | A | * | 7/1999 | Henrikson | 714/712 |
| 5,961,623 | A | * | 10/1999 | James et al. | 710/113 |
| 5,996,034 | A | * | 11/1999 | Carter | 710/100 |
| 6,032,261 | A | * | 2/2000 | Hulyalkar | 713/400 |
| 6,389,547 | B1 | * | 5/2002 | James et al. | 713/400 |
| 6,405,272 | B1 | * | 6/2002 | Regis | 710/121 |
| 6,601,124 | B1 | * | 7/2003 | Blair | 710/305 |
| 6,633,943 | B1 | * | 10/2003 | James et al. | 710/306 |
| 6,751,697 | B1 | * | 6/2004 | Shima et al. | 710/306 |
| 6,772,267 | B2 | * | 8/2004 | Thaler et al. | 710/306 |
| 2001/0037422 | A1 | * | 11/2001 | Thaler et al. | 710/126 |
| 2002/0167953 | A1 | * | 11/2002 | Scheel et al. | 370/401 |
| 2002/0178306 | A1 | * | 11/2002 | Shimizu | 710/56 |
| 2002/0184422 | A1 | * | 12/2002 | Regis | 710/240 |

FOREIGN PATENT DOCUMENTS

| JP | 63192149 A | * | 8/1988 | ........... G06F/13/20 |
| JP | 04329453 A | * | 11/1992 | ......... G06F/13/362 |

* cited by examiner

*Primary Examiner*—Mark H. Rinehart
*Assistant Examiner*—Donna K. Mason

(57) ABSTRACT

A method for preventing net update oscillation of a bus bridge by competing net update messages is presented. The method includes the steps of (a) determining whether a particular portal is a coordinator on its local bus; and proceeding to step (b) (i) if the particular portal is a coordinator, otherwise, proceeding to step (b) (ii); (b) (i) determining whether the particular portal finds a net update collision on its local bus; and proceeding to step (c) if the net update collision is found, (b)(ii) determining whether the particular portal receives an UPDATE_ROUTE message from another portal that is a coordinator on the local bus; and proceeding to step (c) if the UPDATE_ROUTE message is received; (c) setting a global net_update bit to one by a lock procedure, (d) verifying whether the lock procedure in step (c) has been successfully performed by determining whether the net_update bit has been set to one,(e) performing one of: (i) discarding the net update if it has been determined in step (d) that the lock procedure in step (c) has not been successfully performed, and (ii) processing the net update according to IEEE1394.1 bridge standard and setting the net_update bit to zero.

12 Claims, 2 Drawing Sheets

METHOD TO PREVENT NET UPDATE OSCILLATION

BACKGROUND OF THE INVENTION

1. Field of the Invention

The present invention relates to bridged serial bus. More particularly, the present invention relates to net update oscillation problems in serial bus bridges such as the IEEE 1394.

2. Description of the Related Art

A net refers to a collection of buses which are interconnected by bridges. According to the IEEE definition, a bridge implements two portals and forwards asynchronous subactions, and may also forward isochronous subactions according to route information which is stored. Each bus that forms a net has an individual identifier that is unique if the net is stable and configured properly. In particular, in an IEEE 1394 net, there can be up to 1,023 logical buses and up to 63 nodes on each bus. Loop interconnection is physically allowed between buses within a net. However, loop(s), if any, shall be eliminated by muting at least one bridge per a loop according to IEEE1394 bridge draft standard. When two or more bridged nets are connected, a net update procedure is required.

According to IEEE1394.1 bridge draft standard version 1.00, prime portal is defined as a singular portal within a net of interconnected buses and clan is defined as a group of affiliated bridge portals that exhibit allegiance to the same prime portal. When two nets are connected, it is possible for bridge portals on the same bus to belong to different clans. However, this is a temporary condition that is resolved by net update procedures.

When a coordinator finds portals belong to different clans, the coordinator shall select one prime portal and update packet routing information according to IEEE1394.1 bridge draft standard. The coordinator, then, shall send an UPDATE_ROUTE message to each portal on its local bus in order to update each portal's packet routing information and clan affinity.

If a new update process is initiated while another net update(s) is(are) being processed, these net update processes shall be merged into one. Otherwise, a net can not be configured properly. According to the IEEE1394.1 draft standard version 1.00, only a coordinator can detect net update collision and initiate new update processes after selecting a surviving prime portal and updating packet routing information.

However, a problem arises in that if a bridge observes a net update process on one portal while processing another net update received on the other portal, two different UPDATE_ROUTE messages related to the two different net updates can be passed to each other at the bridge without being merged into one. Then, both bridge portals are updated with the UPDATE_ROUTE messages exchanged with each other, and then initiate bus resets on their local buses.

As a result, each coordinator on each bus observes a new different net update collision. Two coordinators then may send different UPDATE_ROUTE messages to each portal on its local bus because of the different net update collisions. If these happen, the same bridge will observe a net update process at one portal while processing another net update received at the other portal again. It could result in an infinite net update oscillation problem.

For example, FIG. 1 illustrates a time flow diagram 100 of an example that two UPDATE ROUTE messages are received by a bridge on its two local buses and the two UPDATE ROUTE messages will be passed by and be forwarded to the other buses.

A net update process starts when a bridge receives a net update message from a portal. Normally, after a coordinator (i.e. the bridge portal in charge of net updates) receives a net update message, the bridge's clan information is updated, and the process ends with the initiation of a bus reset on the other portal's bus.

The coordinator (not shown) on the first bus A (not shown) sends a net update message 120, which at point 140 is received by bus B. At approximately the same time 130, the coordinator (not shown) on bus B sends a net update message to bus A, which is received at time 110. Thus there is a "crossing" of update messages between the start from one bus to the reset on the other bus, in the time frame referred to as a net update period (the period from 130 to 140).

When first bus A receives the clan information, which includes reset information from second bus B, it updates its clan information and a reset is initiated.

Thus, the respective coordinators for A and B will still detect "competition" regarding the bridge clan information and both will again perform net updates.

Subsequently, the two coordinators will initiate different update processes again. The bridge may then again receive two different net update messages on both portals by the crossing at 150. An infinite net update loop can be the result. In other words, the bridge continuously receives two net update messages on both portals and forwards them to the buses infinitely. In such a situation, the net configuration is never finished. This looping is referred to as net update oscillation.

SUMMARY OF THE INVENTION

According to an aspect of the present invention, a method to prevent net update oscillation includes the bridge selecting only one of UPDATE_ROUTE messages each of which is created by each portal itself if the portal is a coordinator on its local bus, otherwise sent by a portal's local coordinator and received by the portal. Then next, the bridge discards the other UPDATE_ROUTE message, so that an infinite net update oscillation cannot occur. The selected UPDATE_ROUTE message, which is referred to as a survived NET_UPDATE message, will be processed by the bridge according to IEEE 1394.1 bridge draft standard, therefore the portal that received the survived UPDATE_ ROUTE message initiates a bus reset as an initiation of a net event, while the other portal doesn't. Then, a coordinator (which could be the portal) after the bus reset will find the net update process collision and solve the issue according to IEEE 1394.1 bridge draft standard.

Since one of the net update events observed by the bridge has been discarded and only one net update event will be processed, net update events cannot be passed to each other at a bridge. That can prevent the net oscillation problem explained above.

DETAILED DESCRIPTION OF THE INVENTION

With regard to how the bridge selects the survived UPDATE_ROUTE message received by one portal and discards the other received, the following examples are for explanatory purposes only and do not limit the claimed invention to just these criteria for selecting a survived message and discarding a victim message.

(1) First in time; the bridge keeps the first received net update message on one bus and discards the second message;

(2) CPU priority, one CPU; the message found first by the CPU is kept and the other message is discarded; or CPU priority multiple CPUs; the first CPU that reports a net update event detection to the other CPU processes it, while the other CPU that detects subsequent net update events before the first net update event is completed will ignore the net update events; or (4) Configuration of portals; one portal in a bridge can be designated as the survivor and the other as the victim. If each portal of the bridge receives an UPDATE_ROUTE message or founds a net update event then creates an UPDATE_ROUTE message as a coordinator, the NET_UPDATE message from the victim portal is discarded and the other NET_UPDATE message from the survivor portal is processed; or (5) Using the same prime selection criteria specified by IEEE 1394.1 draft standard; but in this case the bridge may not edit any update messages. The bridge shall keep and process the UPDATE_MESSAGE corresponding to the survived prime selected according to IEEE1394.1 bridge draft standard, and discard the other UDPATE_ROUTE message.

Figure 1:
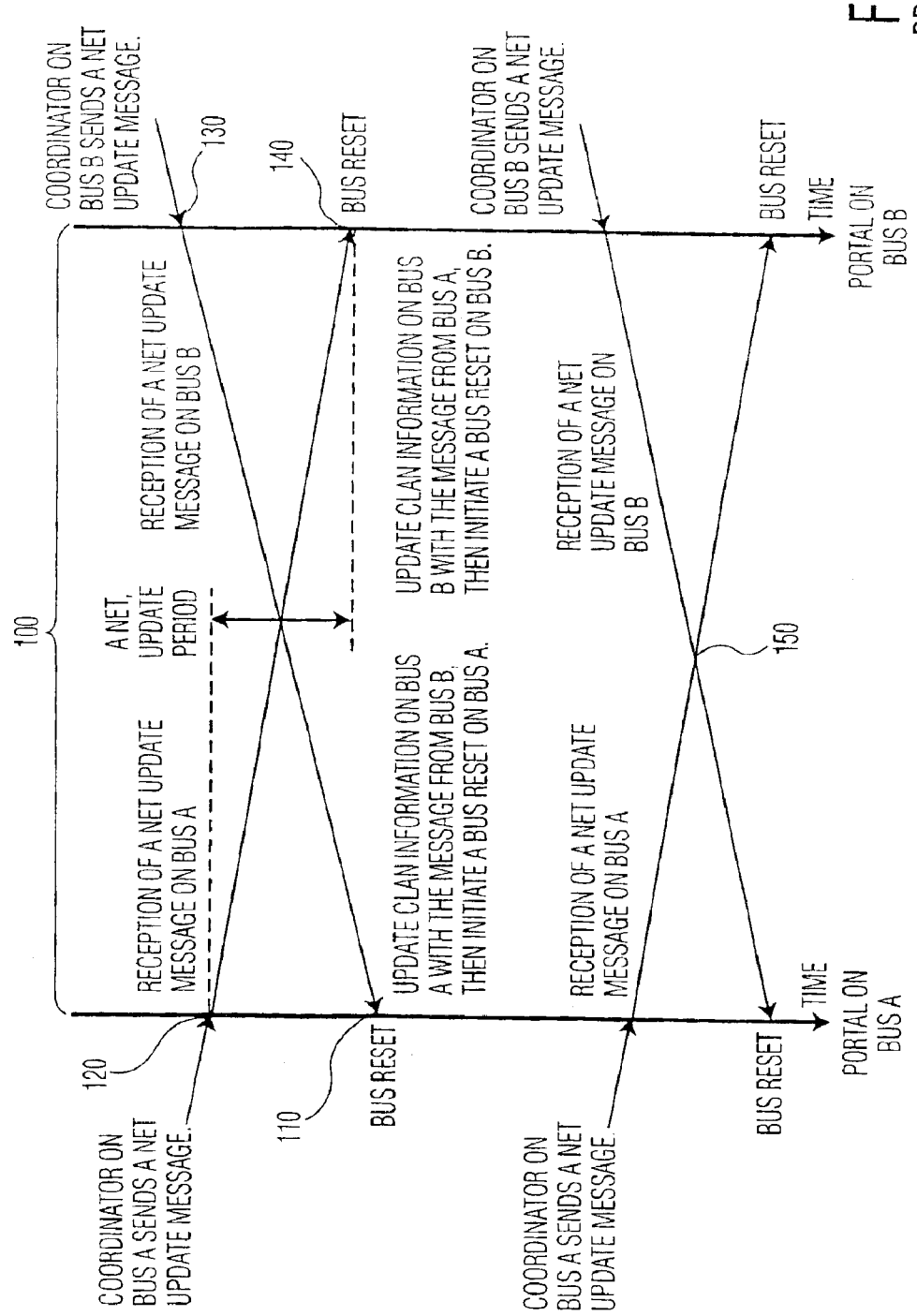
FIG. 1 is a time flow diagram showing how in the prior art infinite net oscillation can occur.
Figure 2:
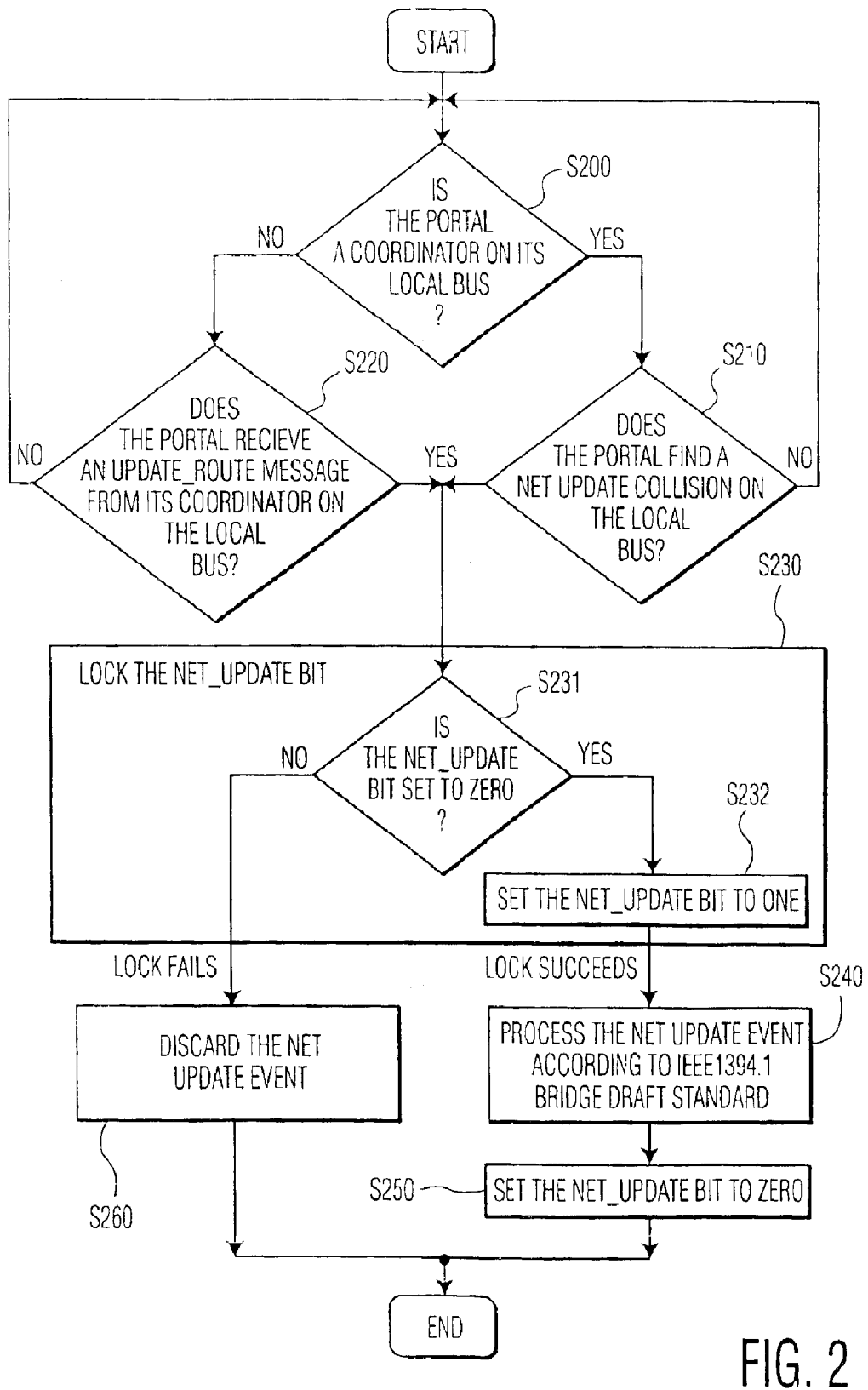
FIG. 2 is a flowchart of a method of the present invention to prevent net update oscillation.

FIG. 2 shows a flowchart providing one example of ways of implementing the invention. A bridge implementing the procedure described by the following flowchart shall implement a global bit shared by the both portals. The global bit can be implemented in either software or hardware, and is called net_update bit for an explanatory purposes. A well-known lock procedure is used to set the global net_update bit to one. The global net_update bit can be cleared to zero by a portal that has set it to one. The initial value of the net_update bit shall be zero.

At step 200, if the portal is a coordinator on its local bus, step 210 will be processed next, otherwise if the portal is not a coordinator on its local bus, step 220 will be executed next.

At step 210, if the portal finds a net update collision on the local bus according to IEEE1394.1 bridge draft standard, step 230 will be next performed. Otherwise, step 200 will be processed next.

At step 220, if the portal receives an UPDATE_ROUTE message from its coordinator on the local bus, step 230 will be performed next. Otherwise, the step 200 will be processed next.

At step 230, the global net_update bit is set to one by a well-known lock procedure. For example, at step 231, if the net_update bit identifies one, the lock fails. Otherwise, if the net update bit is set to zero, at step 232 the global net_update bit is set to one and the lock succeeds. If the lock of step 230 fails, step 260 will be next processed. Otherwise, the lock of step 230 successes, step 240 will be next processed.

At step 240, the net update is processed by the portal according to IEEE 1394.1 bridge draft standard. Step 250 will be next processed.

At step 250, the portal clears the net_update bit to zero.

At step 260, the portal discards the net update event. For this case, the other portal has been processing another net update found at the other portal's local bus.

As a result of step 260, one of two net update events found by the bridge is discarded and a possible net update oscillation problem can be prevented.

In all of the preceding an IEEE 1394 or equivalent thereof may be used, but the invention expressly is not limited to the IEEE 1394 and can be used on any serial bus bridge.

What is claimed is:

1. A method for preventing net update oscillation of a bus bridge by competing net update messages, said method comprising the steps of:
    (a) determining whether a particular portal is a coordinator on its local bus; and proceeding to step (b) (i) if said particular portal is a coordinator, otherwise, proceeding to step (b) (ii);
    (b) (i) determining whether said particular portal finds a net update collision on its local bus; and proceeding to step (c) if the net update collision is found;
    (b)(ii) determining whether the particular portal receives an UPDATE_ROUTE message from another portal that is a coordinator on the local bus; and proceeding to step
    (c) if the UPDATE_ROUTE message is received;
    (c) setting a global net_update bit to one by a lock procedure;
    (d) verifying whether the lock procedure in step (c) has been successfully performed by determining whether the net_update bit has been set to one;
    (e) performing one of:
        (i) discarding the net_update bit if it has been determined in step (d) that the lock procedure in step (c) has not been successfully performed; and
        (ii) processing the net_update bit according to IEEE1394.1 bridge standard and setting the net_update bit to zero.

2. A method of preventing net update oscillation of a bus bridge by competing net update messages, comprising:
    (a) receiving on a first portal of said bus bridge a first net update message from a first coordinator on a first bus;
    (b) receiving on a second portal of said bus bridge a second net update message from a second coordinator on a second bus before said first net update message has been processed by said first portal of said bus bridge;
    (c) selecting and processing by the bridge of one of the first and second net update messages as a surviving net update message, and discarding the other of the first and second net update messages; and
    (d) updating clan information so that both the first and second portal contains clan information of the surviving net update message.

3. The method according to claim 2, wherein step (c) includes initiating a reset of one of the first bus and second bus that had a discarded net update message.

4. The method according to claim 3, further comprising:
    (f) initiating a reset of the bus from which the portal of the survived net update message has been selected in step (c).

5. The method according to claim 2, wherein the net update message being received first in time is selected in step (c).

6. The method according to claim 2, wherein the bridge comprises one Central Processing Unit (CPU), and the net update message found first by the CPU is selected in step (c) as the surviving net update message.

7. The method according to claim 2, wherein the bridge comprises a multiple Central Processing Unit (CPU) configuration, and the net update message that is first reported by one CPU to at least one other CPU in the multiple CPU configuration is selected in step (c) as the surviving net update message.

8. The method according to claim 2, wherein a configuration of the first portal and second portal of the bridge designates one of the first portal and the second portal for selection of its net update message in step (c) to be designated as the surviving net update message.

9. The method according to claim 2, wherein the net update message selected in step (c) as the surviving net update message is selected by prime selection criteria according to IEEE1394.1 draft standard, except that the bridge does not edit any update messages.

10. An apparatus for preventing net update oscillation of a bus bridge by competing net update messages, the apparatus comprising:

a processor in communication with a memory, the processor executing code for:

setting a global net_update bit to one by a lock procedure when a net update collision is determined;

verifying whether the lock procedure has been successfully performed by determining whether the net_update bit has been set to one the net_update bit;

discarding the net—update bit when the lock procedure has not been successfully performed.

11. The apparatus according to claim 10, wherein the processor further executing code for:

processing the net_update bit according to IEEE 1394.1 bridge standard and setting the net_update bit to zero.

12. The apparatus as recited in claim 10, wherein the code is stored in the memory.

\* \* \* \* \*